(12) United States Patent
Andarawis et al.

(10) Patent No.: US 8,829,840 B2
(45) Date of Patent: Sep. 9, 2014

(54) AUTO-COMPENSATING SYSTEM AND METHOD FOR CONDITION MONITORING OF ELECTRICAL MACHINES

(75) Inventors: Emad Andarawis Andarawis, Ballston Lake, NY (US); Ertugrul Berkcan, Clifton Park, NY (US); Brock Matthew Lape, Clifton Park, NY (US); David Richard Esler, Gloversville, NY (US)

(73) Assignee: General Electric Company, Niskayuna, NY (US)

( * ) Notice: Subject to any disclaimer, the term of this patent is extended or adjusted under 35 U.S.C. 154(b) by 242 days.

(21) Appl. No.: 13/097,641

(22) Filed: Apr. 29, 2011

(65) Prior Publication Data

US 2012/0274258 A1 Nov. 1, 2012

(51) Int. Cl.
*H02P 1/00* (2006.01)

(52) U.S. Cl.
USPC ............. 318/490; 318/471; 318/472; 318/34; 318/85; 385/12; 340/682

(58) Field of Classification Search
USPC ................ 318/490, 471, 472, 34, 85; 385/12; 340/682
See application file for complete search history.

(56) References Cited

U.S. PATENT DOCUMENTS

| 553,968 | A | * | 2/1896 | Sanor | 5/147 |
|---|---|---|---|---|---|
| 936,721 | A | * | 10/1909 | Holton | 277/607 |
| 2,194,388 | A | * | 3/1940 | Haugh | 454/282 |
| 2,332,241 | A | * | 10/1943 | Milligan et al. | 51/308 |
| 4,626,753 | A | * | 12/1986 | Letterman | 388/809 |
| 4,962,660 | A | * | 10/1990 | Dailey et al. | 73/12.09 |
| 5,020,234 | A | * | 6/1991 | Alkire et al. | 33/656 |
| 5,231,335 | A | * | 7/1993 | Mega et al. | 318/85 |
| 5,493,894 | A | | 2/1996 | Dailey et al. | |
| 5,524,474 | A | * | 6/1996 | Lavallee et al. | 73/12.09 |
| 5,684,718 | A | | 11/1997 | Jenkins et al. | |
| 5,710,509 | A | * | 1/1998 | Goto et al. | 324/207.25 |
| 6,445,147 | B1 | * | 9/2002 | Saitoh et al. | 318/34 |
| 7,652,587 | B2 | * | 1/2010 | Hohn et al. | 340/682 |
| 8,076,909 | B2 | * | 12/2011 | Diatzikis et al. | 322/99 |

(Continued)

FOREIGN PATENT DOCUMENTS

| EP | 553968 A2 | 8/1993 |
|---|---|---|
| EP | 936721 B1 | 6/2006 |

(Continued)

OTHER PUBLICATIONS

Search Report from corresponding GB Application No. GB1207257.5 dated Sep. 3, 2012.

(Continued)

*Primary Examiner* — Paul Ip
(74) *Attorney, Agent, or Firm* — Joseph J. Christian (57) ABSTRACT

A condition monitoring method for an electrical machine is provided. The method includes providing at least one first sensor element embedded in or disposed on at least one substrate element located in a stator core for obtaining a first set of data. The method also includes providing at least one second sensor element for obtaining a second set of data from the electrical machine. Further, the method includes generating signals indicative of changes in characteristics of the first sensor element based on the second set of data. Finally, the method includes refining the first set of data by combining the first set of data with the generated signals.

23 Claims, 5 Drawing Sheets

(56) References Cited

U.S. PATENT DOCUMENTS

| | | | |
|---|---|---|---|
| 2001/0008352 A1* | 7/2001 | Nondahl et al. | 310/68 C |
| 2008/0094231 A1* | 4/2008 | Hohn et al. | 340/584 |
| 2009/0245717 A1* | 10/2009 | Iversen et al. | 385/12 |

FOREIGN PATENT DOCUMENTS

| | | |
|---|---|---|
| EP | 2194388 A2 | 6/2010 |
| EP | 2332241 A2 | 6/2011 |
| GB | 2483339 A | 3/2012 |
| WO | 2008116966 A3 | 3/2009 |
| WO | 2011163035 A3 | 4/2012 |

OTHER PUBLICATIONS

Andarawis et al.; "System and Method for Monitoring Health of Electrical Machines"; Pending U.S. Appl. No. 12/870,865, filed Aug. 30, 2010; 26 Pages.

* cited by examiner

AUTO-COMPENSATING SYSTEM AND METHOD FOR CONDITION MONITORING OF ELECTRICAL MACHINES

BACKGROUND

The invention relates generally to electrical machines and, in particular, to a system and method of monitoring health of electrical machines.

In general, an electrical machine such as power generator or motor is routinely monitored for proper maintenance and high efficiency during operation. One of the few aspects of monitoring health of the electrical machine is inspecting stator bar windings to ensure the windings are motionless during the operation. Typically, an electrical machine includes a wedge system to induce a radial retaining force to a stator to facilitate reducing movement of the stator bar windings within a stator slot. Such a wedge system may also include ripple springs embedded in the stator winding assembly. The ripple springs are generally in a state of compression to keep the windings from moving. In case, the wedge system becomes loose, the amount of retaining force is reduced such that the stator bar windings may move during operation. Over time, the relative motion of the stator bar windings causes damage to the insulation surrounding the stator bar wedges and a potential stator bar winding failure can occur. This may result in electrical shorts to ground, thereby, diminishing the efficiency of the machine and further decreasing the mean time between failures of the electrical machines. Therefore, it is desired that the stator bar winding movement or the wedge tightness be continuously monitored using sensors. However, the sensors used for monitoring have the tendency to drift with time due to various operating parameter and hence are unstable over a period of time, resulting in inaccurate monitoring of health of electrical machines. Additionally since re-wedging or rewinding of electrical machines may be infrequent, the sensor drift over time may limit the usefulness of the monitoring to short periods of time compared to the expected life of the electrical machine.

Therefore, to assess the condition of the electrical machine, there is a need for an efficient monitoring system that easily and accurately monitors the health of the machine.

BRIEF DESCRIPTION

In accordance with an embodiment of the invention, a condition monitoring method for an electrical machine is provided. The method includes providing at least one first sensor element embedded in or disposed on at least one substrate element located in a stator core for obtaining a first set of data. The method also includes providing at least one second sensor element for obtaining a second set of data from the electrical machine. Further, the method includes generating signals indicative of changes in characteristics of the first sensor element based on the second set of data. Finally, the method includes refining the first set of data by combining the first set of data with the generated signals.

In accordance with an embodiment of the invention, a system for monitoring health of an electrical machine is provided. The system includes at least one first sensor element embedded in or disposed on at least one substrate element located in a stator core for measuring a first set of data. The system also includes at least one second sensor element for measuring a second set of data. The system further includes a control subsystem in communication with the first sensor element and the second sensor element, said control subsystem is configured to monitor the health based on the first set of data and the second set of data.

In accordance with an embodiment of the invention, method for monitoring health of an electrical machine. The method includes providing at least one force sensor embedded in or disposed on at least one substrate element located in a stator core for measuring a first set of sensor data. The method also includes providing at least one second sensor element for measuring a second set of sensor data. The method further includes generating signals indicative of a time-varying change in the force measured by first sensor element based on the second set of sensor data during operation or shutdown of the machine. Finally, the method includes refining the first set of sensor data by combining the first set of sensor data with the generated signals and determining the health of the machine by analyzing the refined signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards an auto-compensating system and method for condition monitoring of electrical machines. As used herein, the phrase 'time varying force' refers to the force exerted by a rotating field that varies with time during operation of the electrical machine, or an attractive and repulsive force between stator bars due to current flow in the bars. Further, the term 'auto-compensating' may refer to automatically making up for a drift in a sensor used for condition monitoring.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
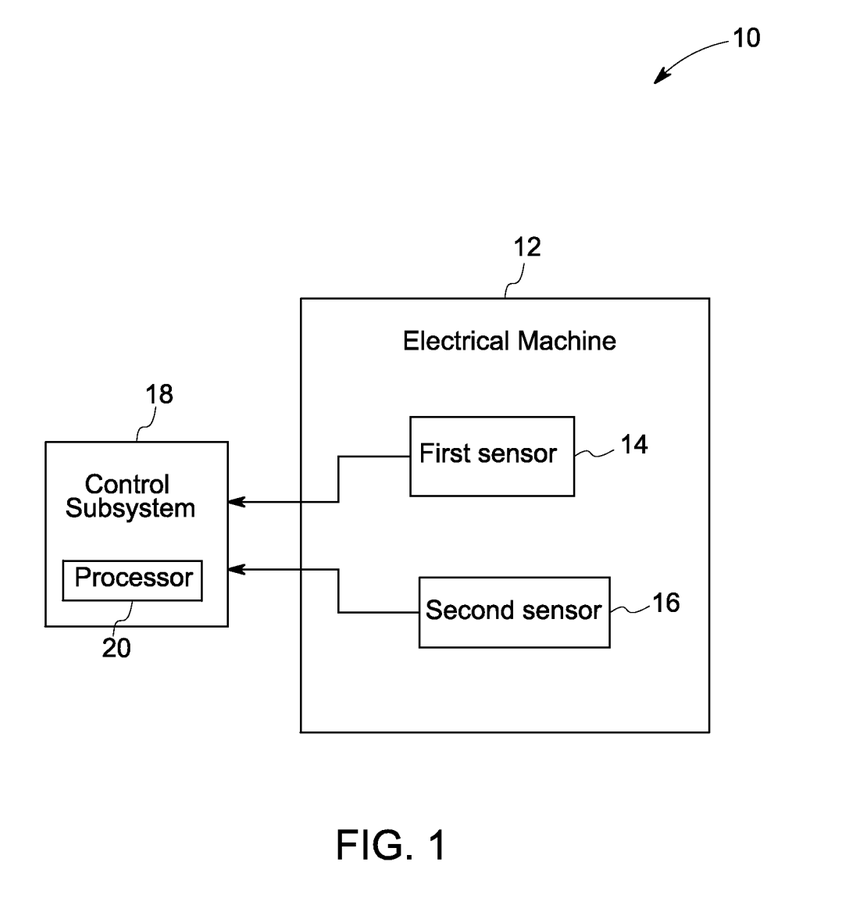
FIG. 1 is a block diagram of an auto-compensating system for condition monitoring of an electrical machine in accordance with an embodiment of the present invention.
Figure 2:
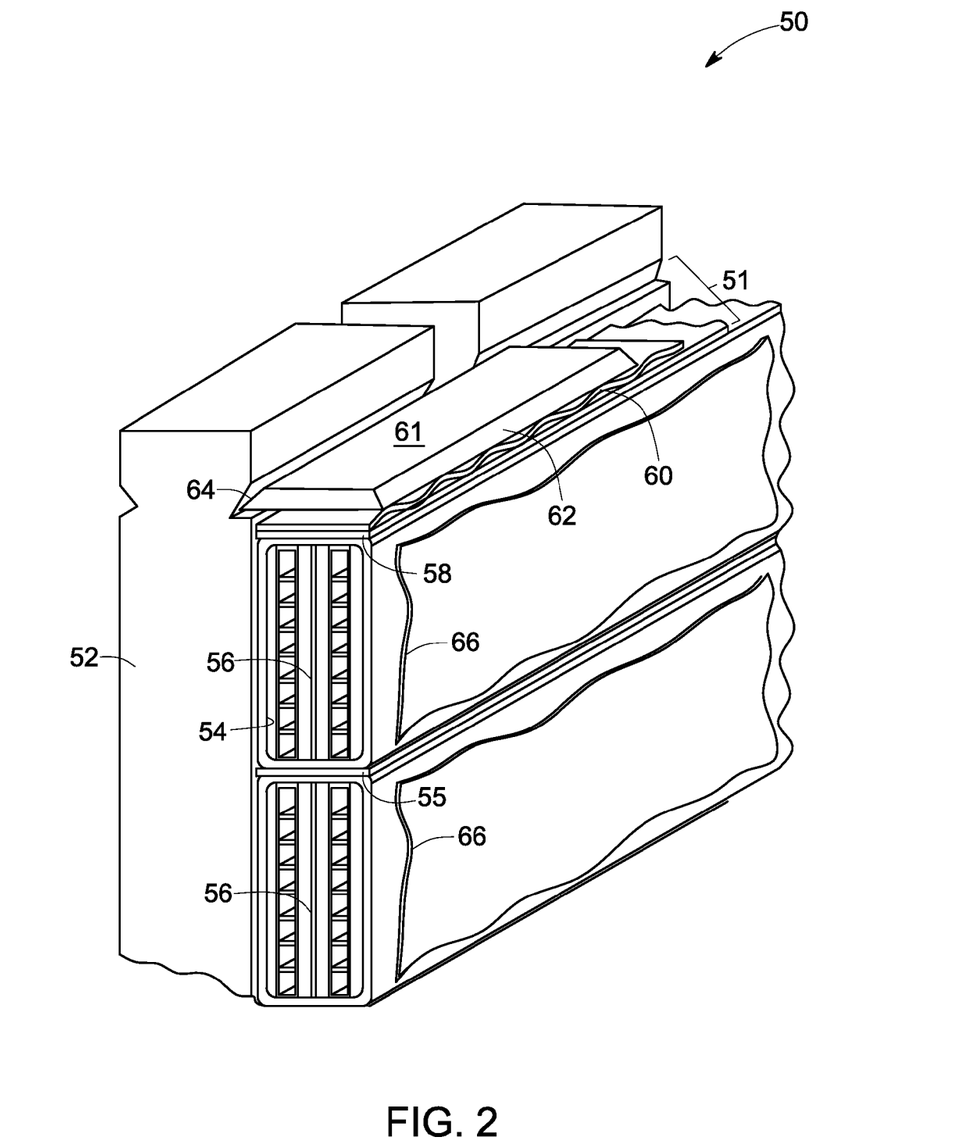
FIG. 2 is a fragmentary isometric view of a portion of the stator of an electric machine illustrating a stator wedge arrangement in accordance with an embodiment of the invention.

FIG. 1 is a block diagram of an auto-compensating system 10 for condition monitoring of an electrical machine 12 in accordance with an embodiment of the present invention. A non-limiting example of the electrical machine 12 includes a power generator or electrical motor that is monitored for proper maintenance and high efficiency during operation. As shown, the auto-compensating system 10 includes at least one first sensor element 14 embedded in or disposed on at least one substrate element located in a stator core 50 (as shown in FIG. 2). The at least one sensor element 14 obtains a first set of data from the electrical machine 12. Non-limiting examples of the first set of data includes multiple forces acting on different parts of the electrical machine 12. The multiple forces are critical for the health of the electrical machine 12 and hence require to be constantly monitored.

In one embodiment, the at least one first sensor element 14 includes a dielectric, conductor, resistor, resistance temperature detectors (RTDs), capacitor, inductor, semiconductor, optical sensor, piezoelectric sensor, pressure sensor, magnetic field sensor, strain sensor, and a load sensor. The substrate element includes a flat plate, a spring, a ripple spring, and a force-to-displacement transducer. In one embodiment, the at least one first sensor element includes a force sensor for measuring a compression force data from the at least one substrate element. The auto-compensating system 10 also includes at least one second sensor element 16 for obtaining a second set of data from the electrical machine 12 or from adjacent machines or ambient conditions surrounding the electrical machine 12. In a non-limiting example, the second set of data includes one of temperature data, time varying force data, time varying force data on stator winding, field strength data of the machine, and combinations thereof. It is to be noted that the field strength corresponds to a load on the electrical machine 12. The at least second sensor element 16 is disposed or embedded in the stator core 50 (as shown in FIG. 2) of the electrical machine 12 and may also include a dielectric, conductor, resistor, resistance temperature detectors (RTDs), capacitor, inductor, semiconductor, optical sensor, piezoelectric sensor, pressure sensor, magnetic field sensor, strain sensor, and a load sensor according to an embodiment of the present invention. In one embodiment, the at least one second sensor element 16 is located remotely outside the electrical machine 12 for measuring the ambient conditions such as temperature or load on the electrical machine 12. The second set of data obtained from the at least second sensor element 16 is used for calibrating the at least one first sensor element 14 by combining with the first set of data. The calibration of the at least first sensor element 14, thus prevents sensor drift with time and avoids incorrect sensing of data. The calibration of the at least first sensor element 14, therefore, provides for use of stable sensors in the electrical machine 12 during operation under the influence of various operating conditions and allows accurate measurements of the first set of data. The auto-compensating system 10 further includes a control subsystem 18. In one embodiment, the control subsystem 18 is in communication with both the first sensor element 14 and the second sensor element 16. The control subsystem 18 is configured to monitor the health based on analyzing the first set of data and the second set of data transmitted from the at least one first sensor element 14 and the at least one second sensor element 16 respectively. In one embodiment, the control subsystem 18 is operated remotely from the electrical machine 12, thereby, allowing remote condition monitoring of the electrical machine 12. This auto-compensation system 10 may also be used for condition monitoring in real time.

In one embodiment, the control subsystem 18 includes a processor 20 configured to receive information from the control subsystem 18 and to analyze data received from the at least one first sensor element 14 and the at least second sensor element 16. In another embodiment, control subsystem 18 includes a power source configured to supply power to the control subsystem 18 and the sensor elements 14 and 16. It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the processor may be equipped with a combination of hardware and software for performing the tasks of the invention, as will be understood by those skilled in the art.

FIG. 2 illustrates a fragmentary isometric view of a portion of a stator core 50 of an electrical machine 12 (as shown in FIG. 1) having a stator wedge mechanism 51 in accordance with an embodiment of the invention. The stator core 50 includes multiple stator teeth 52; which stator teeth 52 further include stator slots 54 configured to accommodate stator windings 56 (also referred to as the stator coils). The stator windings 56 are retained in the stator slots 54 by multiple substrate elements shown as flat plates 55, shims 58, ripple springs 60, and stator wedges 61 having beveled edges 62 for engaging correspondingly shaped grooves 64 in the sidewalls of the stator teeth 52. Thus, non-limiting examples of substrate elements include flat plates, ripple springs, force-to-displacement transducers and springs such as axial and radial springs and Belleville washers. In one embodiment the flat plate 55 includes a metallic flat plate (conductive). In another embodiment, the flat plate includes a non-metallic flat plate (non-conductive). The ripple springs 60 are compressed between the stator wedges 61 and shims 58 to generate a force that firmly holds the stator windings 56 in place. In one embodiment, the ripple spring 60 is fabricated from a non-conductive material such as, but not limited to, a plastic or fiberglass laminate. The stator core 50 also includes multiple side ripple springs 56 to maintain tight fitting of the stator windings 56 within the stator core 50.

Over time, the ripple springs 56 or side ripple springs 56 may lose their resiliency so that the stator wedges 61 become loose. This can permit the stator windings 56 to vibrate, which can result in damage to the stator core 50 and eventual failure of the electrical machine 12 (as shown in FIG. 1). In order to monitor the tightness of the stator wedge mechanism, the ripple spring 60 includes embedded sensor elements (first sensor element 14 and second sensor element 16 of FIG. 1) that change one or more electromagnetic characteristics along with the compression or decompression of the ripple spring 60. The signals indicating changes in electromagnetic characteristics are acquired from an electrical interface of the ripple spring 60, for example a single port electrical interface, by the control subsystem 18 (as shown in FIG. 1) for further analysis of the signals and subsequent determination of the wedge tightness. Thus, the control subsystem 18 (as shown in FIG. 1) efficiently measures the static compression force experienced by the ripple springs 60. In one embodiment, the side ripple spring also includes sensor elements for measuring the tightness of the stator wedge mechanism. In another embodiment, the sensor elements are disposed on the ripple spring 20.

Furthermore, in one embodiment, the flat plate 55 located between the stator windings 56 includes any of embedded sensors (first sensor element 14 or second sensor element 16 of FIG. 1). In another embodiment, sensors may be disposed on the flat plate 55, which sensors are coupled to the control subsystem 18 (as shown in FIG. 1). In one embodiment, the embedded sensors are coupled to the control subsystem 18 (as shown in FIG. 1) for measuring time varying forces acting on the flat plate 55 during operation or shutdown of the electrical machine 12 (as shown in FIG. 1). The flat plate 55 experience the time varying force due to varying magnetic field due to rotation and temperature fluctuations of both ambience or of electrical machine. This time varying forces can further be efficiently used to calibrate a sensor data. This results in correct sensing and estimation of information for monitoring health of the electrical machine. In yet another embodiment, at least two sensors are embedded in or disposed on multiple substrate elements for measuring the health of the electrical machine during operation or shutdown. In one embodiment, the sensors are embedded in the stator wedge element 61. Further, in one embodiment, a single sensor element may have two separable responses that can be used in the electrical machine, wherein one of the responses is indicative of changes in characteristics of the sensor element.

Figure 3:
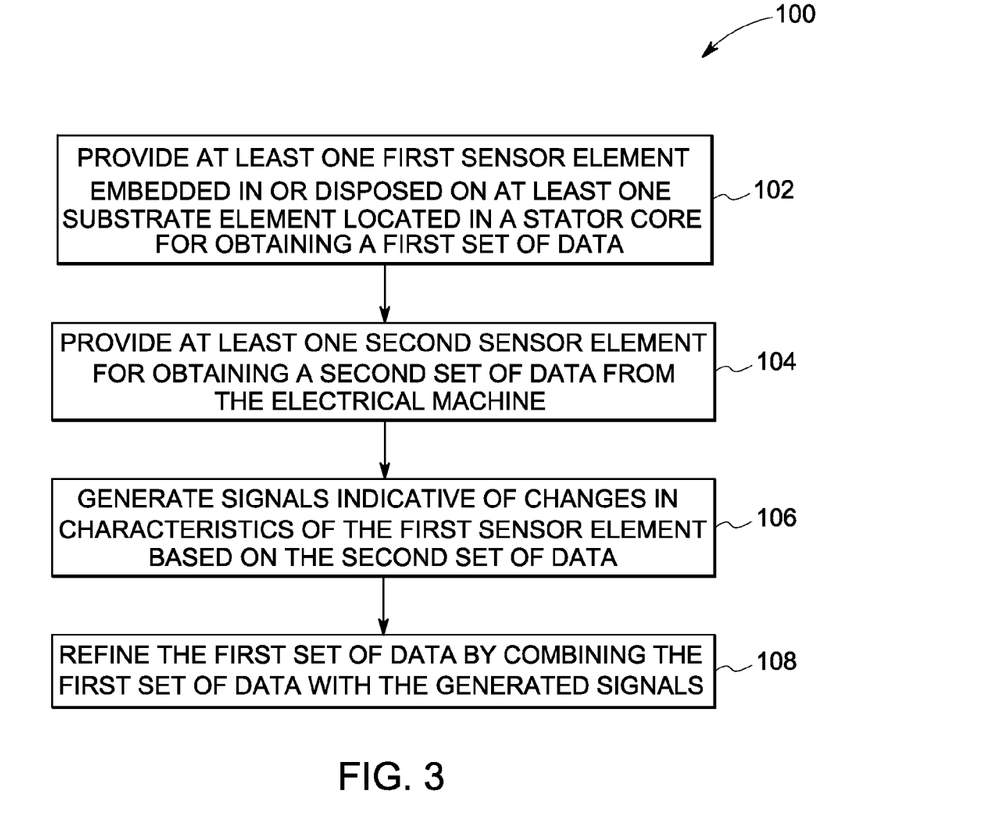
FIG. 3 is a flow chart of an exemplary method for condition monitoring of an electrical machine in accordance with an embodiment of the present invention.

FIG. 3 is a flow chart of an exemplary method 100 for condition monitoring of an electrical machine in accordance with another embodiment of the present invention. At 102, the method includes providing at least one first sensor element embedded in or disposed on at least one substrate element located in a stator core for obtaining a first set of data. In one embodiment, the first set of data includes compression force data of the at least one substrate element of the electrical machine. At 104, the method includes providing at least one second sensor element for obtaining a second set of data from the electrical machine. In one embodiment, the at least one second sensor element is disposed or embedded in the stator core. In another embodiment, the at least one second sensor element is located outside the stator core for obtaining data from surroundings around the electrical machine. In yet another embodiment, the second set of data includes one of temperature data, time varying force data, time varying force data on stator winding, field strength data of the machine, and combinations thereof. In an embodiment, the second sensor data is obtained from a physical sensor such as a temperature, current, or field strength sensor or a virtual sensor data derived from operation parameters such as generator load, or startup and shutdown conditions. Further, at 106 the method includes generating signals indicative of changes in characteristics of the first sensor element based on the second set of data. Finally at 108, the method includes refining the first set of data by combining the first set of data with the generated signals. Furthermore, the method 100 includes determining health of the machine by analyzing the refined signals. The method steps of 106 and 108 provides for the calibration of the at least one first sensor element, thus allowing compensation for the drift in the at least first sensor element due to various operating parameters of the electrical machine.

Figure 4:
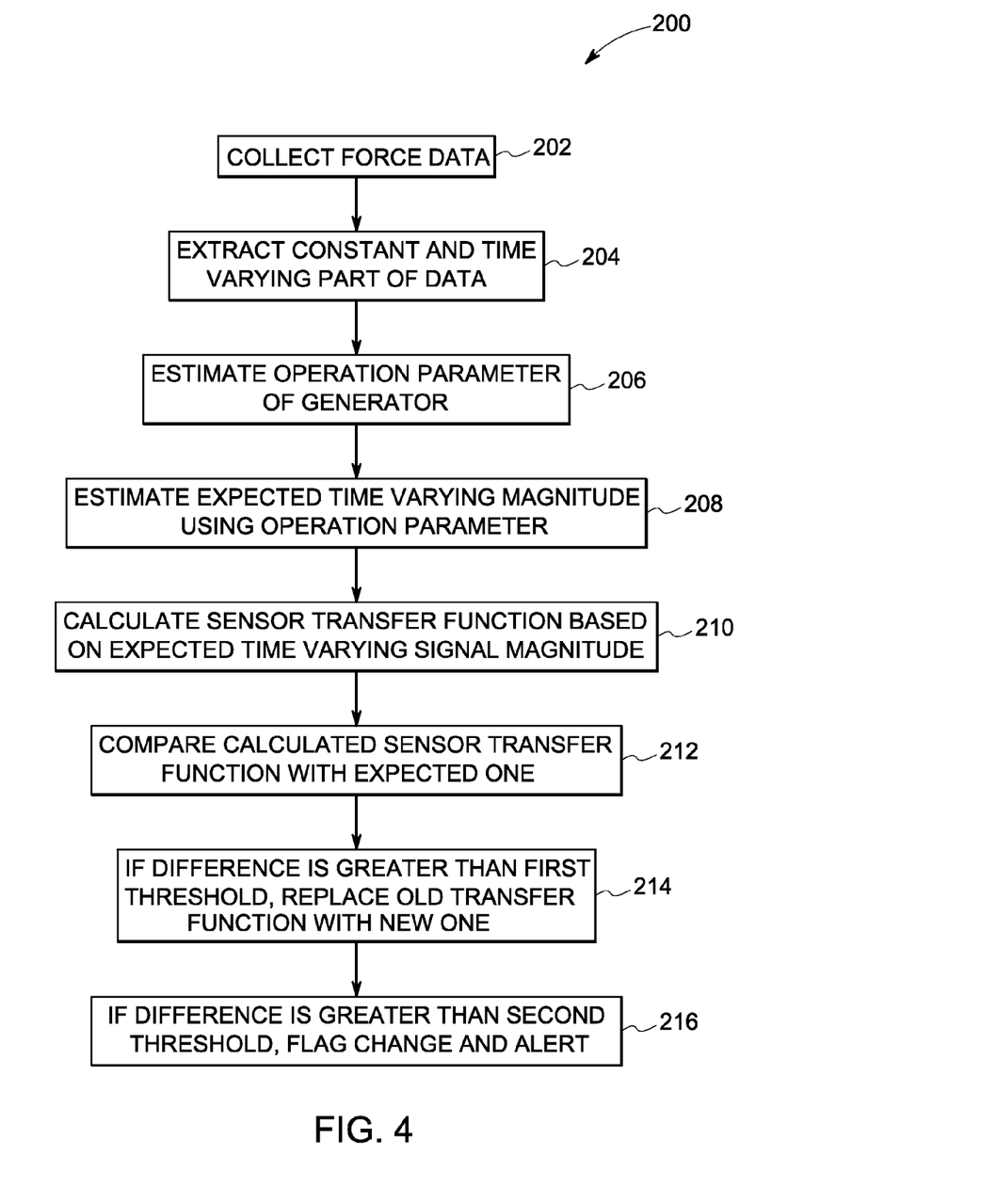
FIG. 4 shows a flow chart of an exemplary calibration method in accordance with an embodiment of the present invention.

FIG. 4 shows a flow chart of an exemplary auto-compensation method 200 in accordance with an embodiment of the present invention. The compensation method 200 may be carried out by the control subsystem 18 having the processor 20 (as shown in FIG. 1). At step 202, the method includes collecting a force data using the at least one first sensor element embedded or disposed in the at least one substrate element of the electrical machine. In one embodiment, the at least one first sensor element includes a compression force sensor. At step 202, the method includes extracting a constant force data and a time varying force data from the collected force data. The auto-compensation method 200 also includes estimating one or more operation parameter data at step 206. Non-limiting examples of such operation parameter includes electrical machine load, winding current, temperature of the electrical machine or ambient temperature or a combination thereof. The auto-compensation method 200 also includes estimating an expected time varying force magnitude using the operating parameter of the electrical machine in step 208. Further, at step 210 the auto-compensation method 200 includes calculating a sensor transfer function based on the expected time varying force magnitude. Furthermore, the auto-compensation method 200 includes comparing the calculated sensor transfer function with the expected time varying force magnitude at step 212. Finally, at step 214, the auto-compensation method 200 replaces the old transfer function with a new transfer function on determining if the difference between the calculated sensor transfer function and the expected time varying force magnitude is more than a first threshold. Furthermore, if the difference between the calculated sensor transfer function and the expected time varying force magnitude is more than a second threshold, then the auto-compensation method flag changes and sends an alert. In one embodiment, a drift factor is calculated based on the difference between the expected and the measured time-varying force. Accordingly, the drift factor is compared to previous calculated drift factors, and a trend of drift over time is calculated. The calculated drift factor is compared against the calculated trend. If the calculated drift factor and the drift trend are within a first threshold, the drift factor is applied to sensor data to provide a refined, or drift corrected value. If the drift factor and the drift trend are above a second threshold, the condition is flagged and an alert is sent. In another embodiment, the drift factor is applied without comparing it with the trend. In yet another embodiment, calculated drift factors are averaged in time to provide filtered slowly varying compensation factors.

Figure 5:
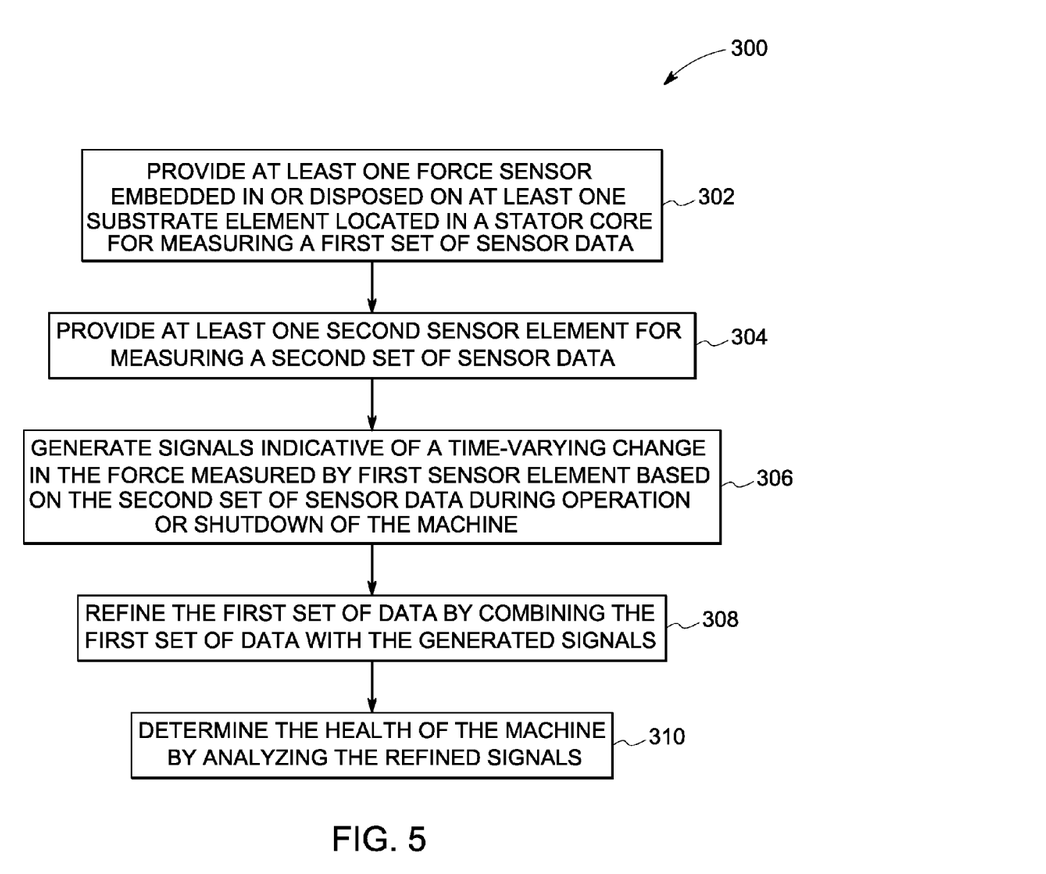
FIG. 5 is a flow chart of an exemplary method for monitoring health of an electrical machine in accordance with another embodiment of the present invention.

FIG. 5 is a flow chart of an exemplary method 300 for monitoring health of an electrical machine in accordance with another embodiment of the present invention. At 302, the method includes providing at least one force sensor embedded in or disposed on at least one substrate element located in a stator core for measuring a first set of sensor data. At 304, the method includes providing at least one second sensor element for measuring a second set of sensor data. In one embodiment, the at least one second sensor element is disposed or embedded in the stator core. In another embodiment, the at least one second sensor element is located outside the stator core for obtaining data from surroundings around the electrical machine. In yet another embodiment, the second set of data includes one of temperature data, time varying force data, time varying force data on stator winding, field strength data of the machine, and combinations thereof. At 306, the method also includes generating signals indicative of a time-varying change in the force measured by first sensor element based on the second set of sensor data during operation or shutdown of the machine. Further at 308, the method includes refining the first set of sensor data by combining the first set of sensor data with the generated signals and finally determining the health of the machine by analyzing the refined signals at 310.

Advantageously, the auto-compensating method and system provides for efficient condition monitoring of the electrical machine by enabling long term use of sensors that otherwise have too much drift to maintain the measurement accuracy overtime. The invention takes into account the time varying force (running force exerted due to rotating field) and operating parameters such as temperature, electrical machine load, winding current for sensor calibration, resulting in correct sensing of conditions of the machine. The present invention also enables the use of thin sensors that may inherently be more prone to drift, and to counterbalance the inherent drift limitations by applying auto-compensation. Further, the present auto-compensating method and system for condition monitoring can be applied to a variety of electrical machines such as generators, motors, broadband generators and the like.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An auto-compensating method for an electrical machine, the method comprising:
    providing at least one first sensor element embedded in or disposed on at least one substrate element located in a stator core for obtaining a first set of data, wherein the first set of data comprises a time varying force data;
    providing at least one second sensor element for obtaining a second set of data, wherein the second set of data is used to estimate an expected time varying force data;
    generating signals indicative of changes in characteristics of the first sensor element based on the second set of data, wherein the generating signals comprises calculating a drift factor based on the difference between the expected time varying force data and the time varying force data; and
    refining the first set of data by combining the first set of data with the generated signals.

2. The method of claim 1, further comprising determining health of the machine by analyzing the refined signals.

3. The method of claim 1, wherein said at least one second sensor element is disposed in the stator core.

4. The method of claim 1, further comprising calibrating the at least one first sensor element using the second set of data.

5. The method of claim 1, wherein the at least one substrate element comprises one of a flat plate, a spring, a ripple spring, and a force-to-displacement transducer.

6. The method of claim 1, further comprising remotely monitoring tightness of a plurality of substrate elements arranged proximate to a plurality of stator wedges in the electrical machine.

7. The method of claim 1, further comprising calculating a drift trend over time by comparing the calculated drift factor to previous calculated drift factors.

8. The method of claim 7, further comprising comparing the drift trend with the calculated drift factor to estimate a drift value based on the difference between the drift trend and the drift factor.

9. The method of claim 8, further comprising applying the calculated drift factor to the first set of data when the drift value is within a first threshold.

10. The method of claim 8, further comprising alerting when the drift value is above a second threshold.

11. An auto-compensating system for monitoring health of an electrical machine, said electrical machine including a stator core, the system comprising:
    at least one first sensor element embedded in or disposed on at least one substrate element located in the stator core for measuring a first set of data, wherein the first set of data comprises a constant force data and a time varying force data;
    at least one second sensor element for measuring a second set of data, wherein the second set of data is used to estimate an expected time varying force data; and
    a control subsystem in communication with the first sensor element and the second sensor element, said control subsystem is configured to generate signals by calculating a drift factor based on the difference between the expected time varying force data and the time varying force data, refine the first set of data by combining the first set of data with the generated signals and monitor the health based on the refined first set of data.

12. The system of claim 11, wherein the at least one substrate element comprises one of a flat plate, a spring, a ripple spring, and a force-to-displacement transducer.

13. The system of claim 11, wherein the at least one substrate element is located between stator windings of the stator core.

14. The system of claim 11, wherein the at least one substrate element is located between a stator wedge and a stator winding in a stator slot.

15. The system of claim 11, wherein the control subsystem is further configured to:
    generate signals based on changes in characteristics of the first sensor element corresponding to the first set of data;
    refine the generated signals by combining the first set of data with the second set of sensor data; and
    determine the health of the machine by analyzing the refined generated signals.

16. The system of claim 15, wherein the characteristics of the second sensor element varies with at least one of temperature, time varying force and field strength acting on the substrate element during the operation of the electrical machine.

17. The system of claim 11, wherein the characteristics of the first sensor element varies with compression of the substrate element.

18. The system of claim 11, wherein one of the first sensor element and the second sensor element comprises one of a dielectric, conductor, resistor, resistance temperature detectors (RTDs), capacitor, inductor, semiconductor, optical sensor, piezoelectric sensor, pressure sensor, magnetic field sensor, strain sensor, and a load sensor.

19. The system of claim 11, wherein the system monitors the stator wedge tightness continuously during operation of the electrical machine.

20. The system of claim 11, wherein the control subsystem is further configured to interrogate the at least one first and second sensor element continuously or at a predetermined interval.

21. An auto-compensating method for an electrical machine, the method comprising:
    collecting a force data using the at least one first sensor element embedded or disposed in the at least one substrate element of the electrical machine;
    extracting a constant force data and a time varying force data from the collected force data;
    estimating one or more operation parameter data using at least one second sensor element;

estimating an expected time varying force magnitude using the operating parameter of the electrical machine;

calculating a sensor transfer function based on the expected time varying force magnitude;

comparing the calculated sensor transfer function with the expected time varying force magnitude;

replacing the calculated sensor transfer function with a new transfer function on determining if the difference between the calculated sensor transfer function and the expected time varying force magnitude is more than a first threshold; and sending an alert if the difference between the calculated sensor transfer function and the expected time varying force magnitude is more than a second threshold.

22. The method of claim 21, wherein the at least one first sensor element comprises compression force sensor.

23. The method of claim 21, wherein the one or more operation parameter data comprises electrical machine load, winding current, temperature of the electrical machine or ambient temperature or a combination thereof.

* * * * *